United States Patent

Morikawa

Patent Number: 6,002,806
Date of Patent: *Dec. 14, 1999

[54] METHOD OF AND APPARATUS FOR CORRECTING COLOR

[75] Inventor: Seiichiro Morikawa, Kanagawa-ken, Japan

[73] Assignee: Fuji Photo Film Co., Ltd., Kanagawa-Ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/712,384

[22] Filed: Sep. 11, 1996

[30] Foreign Application Priority Data

Sep. 12, 1995 [JP] Japan .................... 7-234253

[51] Int. Cl.⁶ .................... H04N 1/46; G06S 15/00
[52] U.S. Cl. .................... 382/274; 358/520; 358/529
[58] Field of Search .................... 358/500, 521, 358/522, 529, 520; 382/162, 167, 274

[56] References Cited

U.S. PATENT DOCUMENTS

| | | | |
|---|---|---|---|
| 5,003,326 | 3/1991 | Suzuki et al. | 358/521 |
| 5,386,305 | 1/1995 | Usami | 358/521 |
| 5,450,500 | 9/1995 | Brett | 382/162 |

Primary Examiner—Jerome Grant, II
Attorney, Agent, or Firm—Sughrue, Mion, Zinn, Macpeak & Seas, PLLC

[57] ABSTRACT

Hue, lightness, and saturation signals are obtained from an input signal, and hue direction intensity signals with respect to respective unit colors are determined using color corrective intensity functions for respective hues which have been established based on measured values. These hue direction intensity signals are multiplied into corrected intensity signals with respect to the respective colors, which are multiplied by desired correction coefficients. Resulting product signals for the respective unit colors are added into corrected signals with respect to given color signals.

11 Claims, 3 Drawing Sheets

METHOD OF AND APPARATUS FOR CORRECTING COLOR

BACKGROUND OF THE INVENTION

1. Field of the Invention

The present invention relates to a method of and an apparatus for correcting a color in accordance with the hue, lightness, and saturation of a color signal.

2. Description of the Related Art

In the art of printing and platemaking, there have widely been used image reading, recording, and reproducing systems for electrically processing image information read from original images to produce film plates in order to make printing and platemaking processes more efficient and improving the quality of images reproduced from such film plates.

In such an image reading, recording, and reproducing system, it has been customary to use a color correction circuit to determine the hue of a color signal produced when an original image is scanned and correct the color represented by the color signal for the purposes of making clear colors of a reproduced image and removing color impurities therefrom. To make clear colors of a reproduced image, the number of necessary colors may be increased, and to remove color impurities, unwanted colors may be eliminated.

The conventional color correction circuit decides the hue of an input signal from the magnitudes of the three color signals of C, M, Y of the input signal, determines which one of six hues of C, M, Y, B, G, R the decided hue belongs to, and produces a corrective quantity by multiplying, by a corrective coefficient, a reference quantity that is given as a saturation or intensity with respect to the determined hue.

According to the above process of producing a corrective quantity, the calculated hue may possibly differ from the actual hue which the human eye visually recognizes, possibly resulting in the correction of a color which is not intended. Furthermore, since the saturation as the reference quantity is obtained as the density difference between two color signals, the same corrective quantity is produced for light colors and dark colors whose density differences are the same. If the corrective quantity for the dark colors are to increase, then the contrast of the light colors will be increased, with the result that an image which will be reproduced based on those color signals is unnatural to the eye.

To avoid the above drawback, it may be effective to correct the corrective quantity using a function dependent on the lightness. According to such a correcting scheme, however, if the corrective quantity for light colors is to be suppressed, then dilute colors, which have a high lightness but a low saturation, cannot be sufficiently corrected.

SUMMARY OF THE INVENTION

It is a general object of the present invention to provide a method of and an apparatus for highly accurate color correction which takes into account the lightness and saturation of desired colors.

A major object of the present invention is to provide a method of and an apparatus for correcting a color depending on not only the purity, but also the lightness and darkness of a color, by determining a corrected signal taking into account the lightness and saturation of desired colors.

The above and other objects, features, and advantages of the present invention will become more apparent from the following description when taken in conjunction with the accompanying drawings in which a preferred embodiment of the present invention is shown by way of example.

DETAILED DESCRIPTION OF THE PREFERRED EMBODIMENT

Figure 1:
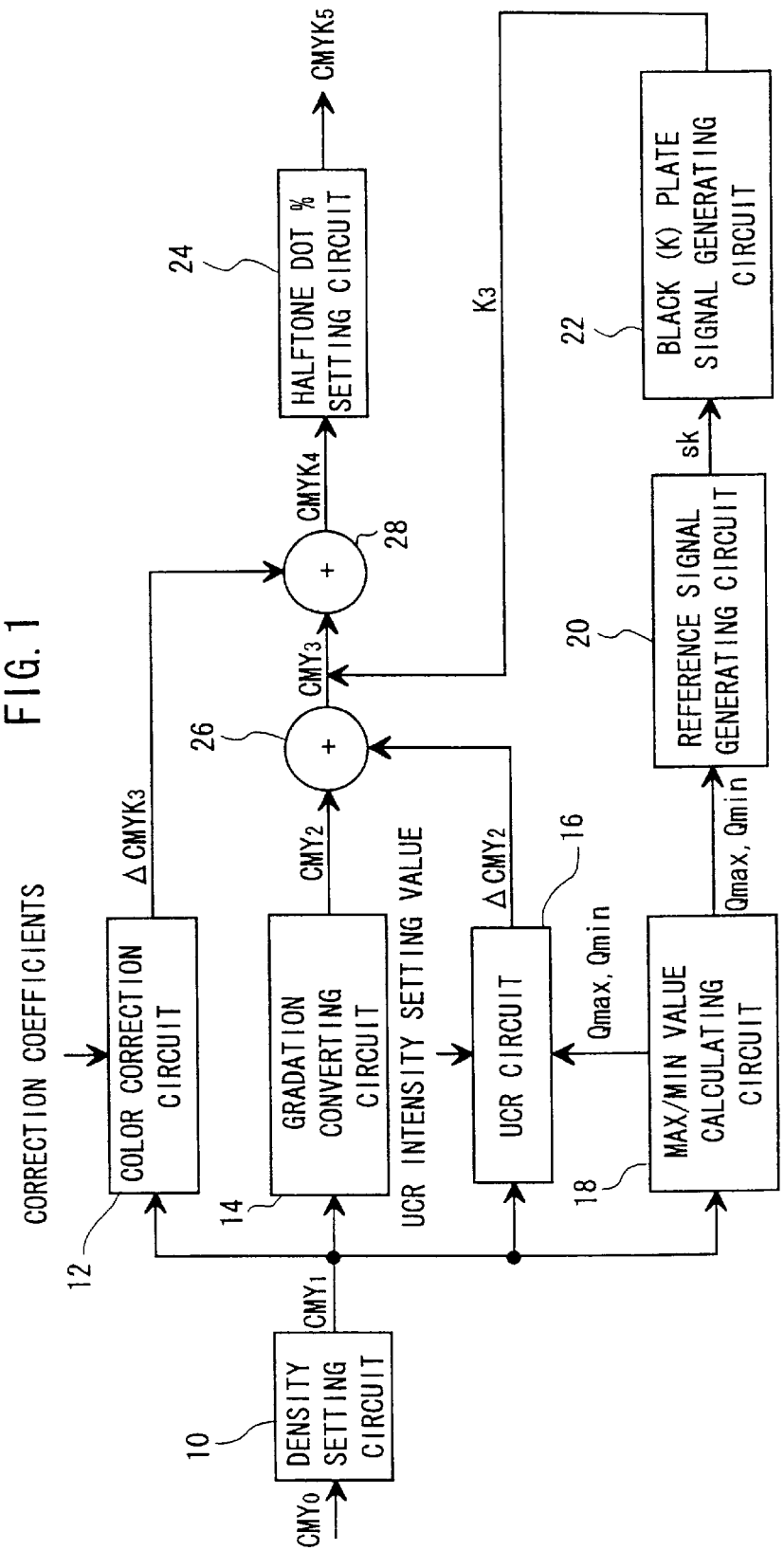
FIG. 1 is a block diagram of an image processing circuit which incorporates a method of and an apparatus for correcting a color according to the present invention.

FIG. 1 shows in block form an image processing circuit which incorporates a method of and an apparatus for correcting a color according to the present invention. The image processing circuit serves to generate four color signals C, M, Y, $K_5$ of cyan (C), magenta (M), yellow (Y), and black (K), including a black signal K, for producing printing film plates, from three color signals C, M, $Y_0$ which have been generated when a color original is scanned.

The image processing circuit has a density setting circuit 10 for generating three color signals C, M, $Y_1$ by adjusting the density values of highlights (HL) and shadows (SH) of the three color signals C, M, $Y_0$ depending on indicated values. The generated three color signals C, M, $Y_1$ are supplied to a color correction circuit 12, a gradation converting circuit 14, a UCR (Under Color Removal) circuit 16, and a maximum/minimum value calculating circuit 18.

The color correction circuit 12, whose details will be described later on with reference to FIG. 2, adjusts the three color signals $CMY_1$ according to correction coefficients which are of desired corrective values for thereby generating four color corrected signals $\Delta CMYK_3$ (=$\Delta C$, $\Delta M$, $\Delta Y$, $\Delta K$). The gradation converting circuit 14 converts the gradations of the three color signals $CMY_1$ using respective tone reproduction curves for thereby generating three color signals $CMY_2$. The UCR circuit 16 generates three color corrected signals $\Delta CMY_2$ for the three color signals $CMY_1$ with respective to a gray component, from the three color signals $CMY_1$ and maximum and minimum values Qmax, Qmin of the three color signals $CMY_1$. The maximum/minimum value calculating circuit 18 determines the maximum and minimum values Qmax, Qmin of the three color signals $CMY_1$.

The image processing circuit further includes a reference signal generating circuit 20, a black (K) plate signal generating circuit 22, and a halftone dot % setting circuit 24.

The reference signal generating circuit 20 generates a reference signal sk for adjusting the level of a black (K) plate signal $K_3$ according to the maximum and minimum values Qmax, Qmin. The black (K) plate signal generating circuit 22 generates the black (K) plate signal $K_3$ according to a predetermined conversion table based on the reference signal sk. The halftone dot % setting circuit 24 generates, from four color signals $CMYK_4$, the four color signals $CMYK_5$ which are halftone dot % signals representative of the halftone dot % values of highlights (HL) and shadows (SH) as adjusted depending on output characteristics.

Between the gradation converting circuit 14 and the halftone dot % setting circuit 24, there are disposed an adder 26 for adding the three color corrected signals $\Delta CMY_2$ to the three color signals $CMY_2$ thereby to generate three color signals $CMY_3$, and an adder 28 for adding the four color corrected signals $\Delta CMYK_3$ to the three color signals $CMY_3$ and the black (K) plate signal $K_3$ thereby to generate the four color signals $CMYK_4$.

Figure 2:
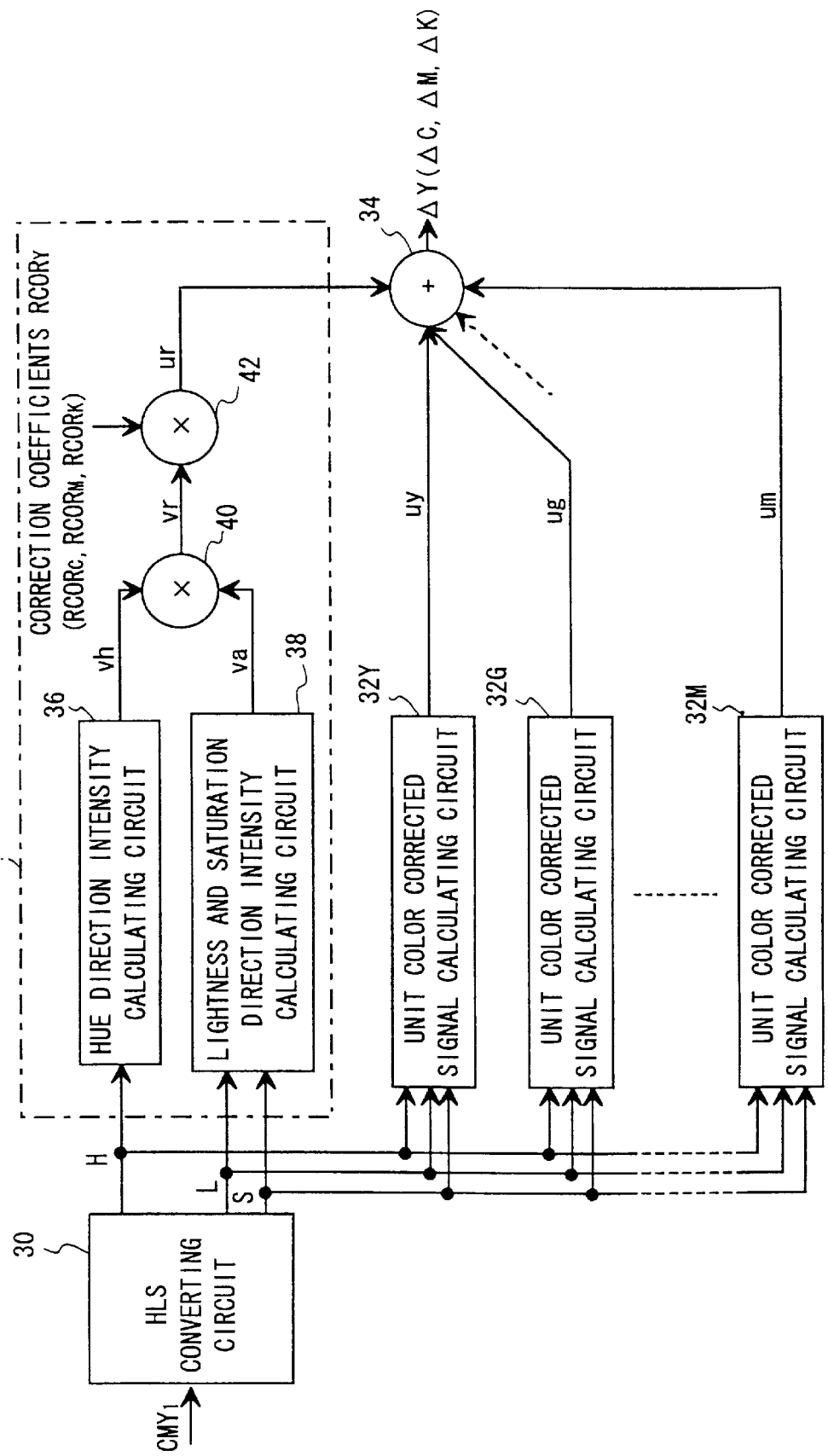
FIG. 2 is a block diagram of a color correction circuit in the image processing circuit shown in FIG. 1.

As shown in FIG. 2, the color correction circuit 12 comprises an HLS converting circuit 30 for converting the three color signals $CMY_1$ into a hue signal H, a lightness signal L, and a saturation signal S, unit color corrected signal calculating circuits 32R, 32Y, 32G, . . . , 32M for calculating unit color corrected signals of respective hues R (red), Y (yellow), G (green), C (cyan), B (blue), M (magenta) from the hue signal H, the lightness signal L, and the saturation signal S, and an adder 34 for adding the unit color corrected signals calculated by the unit color corrected signal calculating circuits 32R, 32Y, 32G, . . . , 32M into one of the four color corrected signals $\Delta CMYK_3$. The unit color corrected signal calculating circuits 32R, 32Y, 32G, . . . , 32M are provided for each of the colors C, M, Y, K.

The unit color corrected signal calculating circuit 32R comprises a hue direction intensity calculating circuit 36 for calculating a hue direction intensity signal vh from the hue signal H according to a hue direction intensity function that has been established with respect to the color R, a lightness and saturation direction intensity calculating circuit 38 for calculating a lightness and saturation direction intensity signal va from the lightness signal L and the saturation signal s according to a lightness and saturation direction intensity function that has been established with respect to the color R, a multiplier 40 for multiplying the hue direction intensity signal vh and the lightness and saturation direction intensity signal va, and a multiplier 42 for multiplying the product signal from the multiplier 40 by correction coefficients which are of corrective values of R supplied from an external source. The other unit color corrected signal calculating circuits 32Y, 32G, . . . , 32M have hue direction intensity functions and lightness and saturation direction intensity functions corresponding to the colors Y, G, . . . , M, and have other circuit details which are identical to those of the unit color corrected signal calculating circuit 32R.

An image processing sequence which is carried out by the image processing circuit shown in FIGS. 1 and 2 will be described below.

Prior to reading an original image, there are determined hue direction intensity functions $F_R(H)$, $F_Y(H)$, $F_G(H)$, . . . , $F_M(H)$ which are color corrective intensity functions for obtaining a hue direction intensity signal vh as a corrective intensity signal from the hue signal H, and lightness and saturation direction intensity functions $G_R(L, S)$, $G_Y(L, S)$, $G_G(L, S)$, . . . , $G_M(L, S)$ which are color corrective intensity functions for obtaining a lightness and saturation direction intensity signal va as a corrective intensity signal from the lightness and saturation signals L, S. The suffixes R, Y, G, . . . , M of the functions represent the respective colors to be corrected.

Then, the halftone dot % values of a reference color chart which covers an entire hue range are determined using a reference color scanner. Thereafter, the color chart is read by a color scanner having the color correction circuit 12 which is to be corrected in colors, generating signals that have not been corrected in colors by the color correction circuit 12, and halftone dot % values of the generated signals are determined. Then, the differences between these halftone dot % values are determined with respect to the respective hues R, Y, G, . . . , M to be corrected, as corrective quantities for the lightness and saturation at the respective hues. A cubic plane is determined from the differences using the method of least squares, and then normalized by a maximum value with a minimum value limited to "0", thereby establishing the lightness and saturation direction intensity functions $G_R(L, S)$, $G_Y(L, S)$, $G_G(L, S)$, . . . , $G_M(L, S)$.

Figure 3:
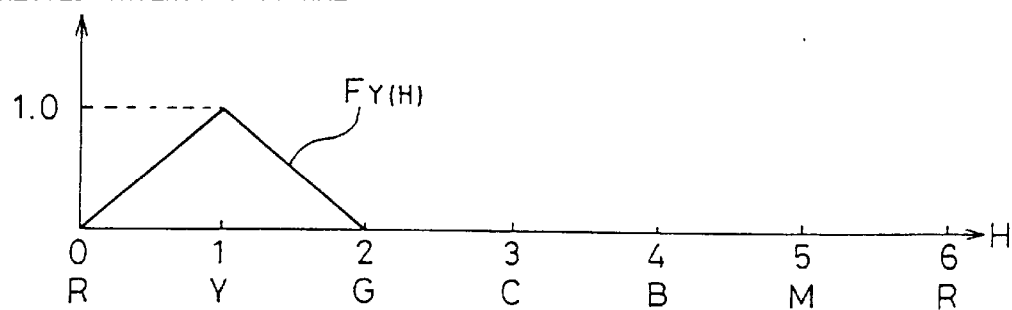
FIG. 3 is a diagram illustrative of a hue direction intensity function.

The hue direction intensity functions $F_R(H)$, $F_Y(H)$, $F_G(H)$, . . . , $F_M(H)$ are temporarily established as a hue direction intensity function which, as shown in FIG. 3, linearly decreases from a hue in question, e.g., a hue Y, as a peak to adjacent hues R, G. Thereafter, the color chart is corrected in colors using the lightness and saturation direction intensity functions $G_R(L, S)$, $G_Y(L, S)$, $G_G(L, S)$, . . . , $G_M(L, S)$ and the hue direction intensity functions $F_R(H)$, $F_Y(H)$, $F_G(H)$, . . . , $F_M(H)$, as described later on, and the correction coefficients are adjusted to equalize the obtained halftone dot % values to reference halftone dot % values. If there is a color shift in a hue different from the hue in question upon adjustment of the correction coefficients with respect to the hue in question, then the temporarily established hue direction intensity functions $F_R(H)$, $F_Y(H)$, $F_G(H)$, . . . , $F_M(H)$ are corrected to compensate for the color shift. In this manner, the hue direction intensity functions $F_R(H)$, $F_Y(H)$, $F_G(H)$, . . . , $F_M(H)$ are established.

With the hue direction intensity functions $F_R(H)$, $F_Y(H)$, $F_G(H)$, . . . , $F_M(H)$ and the lightness and saturation direction intensity functions $G_R(L, S)$, $G_Y(L, S)$, $G_G(L, S)$, . . . , $G_M(L, S)$ being thus established, it is possible to bring the hue, lightness, and saturation of the colors of images generated by the reference color scanner and the color scanner having the color correction circuit 12 which is to be corrected in colors into agreement with each other highly accurately.

A process of correcting a color using the hue direction intensity functions $F_R(H)$, $F_Y(H)$, $F_G(H)$, . . . , $F_M(H)$ and the lightness and saturation direction intensity functions $G_R(L, S)$, $G_Y(L, S)$, $G_G(L, S)$, . . . , $G_M(L, S)$ which have been established as described above will be described below.

An input signal which is a color-separated signal produced when an original image is scanned is converted into three color signals C, M, $Y_0$ (see FIG. 1) by a known masking process. The three color signals $CMY_0$ are then converted into three color signals $CMY_1$, whose highlight and shadow density values are set to indicated density values, by the density setting circuit 10. The three color signals $CMY_1$ are then supplied to the color correction circuit 12, the gradation converting circuit 14, the UCR circuit 16, and the maximum/minimum value calculating circuit 18.

The color correction circuit 12 generates four color corrected signals $\Delta CMYK_3$ from the supplied three color signals $CMY_1$ as follows:

First, the three color signals $CMY_1$ are converted into a hue signal H, a lightness signal L, and a saturation signal S by the HLS converting circuit 30. The hue signal H is in the range of $0.0 \leq H \leq 6.0$, the lightness signal H is in the range of $0.0 \leq L \leq 1.0$, and the saturation signal S is in the range of $0.0 \leq L \leq 1.0$. H=0 represents the hue R, H=1 represents the hue Y, H=2 represents the hue G, H=3 represents the hue C, H=4 represents the hue B, and H=5 represents the hue M. L=0 represents a dark color, and L=1 represents a light color. S=1 represents an impure color, and S=0 represents a pure color.

The HLS converting circuit 30 determines a maximum value Qmax, a middle value Qmid, and a minimum value Qmin of the three color signals $CMY_1$. It is assumed that a color which gives the maximum value Qmax is represented by Pmax, a color which gives the middle value Qmid is represented by Pmid, and a color which gives the minimum value Qmin is represented by Pmin, and that V=(Qmid−Qmin)/(Qmax−Qmin). The hue signal H is determined as:

$H=1.0-V$ when Pmax=Y and Pmin=C, $H=1.0+V$ when Pmax=Y and Pmin=M, $H=3.0-V$ when Pmax=C and Pmin=M, $H=3.0+V$ when Pmax=C and Pmin=Y $H=5.0-V$ when Pmax=M and Pmin=Y, and $H=5.0+V$ when Pmax=M and Pmin=C.

The lightness signal L is determined as:

$L=1.0-Qmax$.

The saturation signal S is determined as:

$S=0.0$ when $Qmax \leq -0.0$, and $S=1.0-(Qmin+0.1)/(Qmax+0.1)$ otherwise.

The hue signal H, the lightness signal L, and the saturation signal S are supplied to the unit color corrected signal calculating circuits 32R, 32Y, 32G, . . . , 32M, which generate an R corrected signal ur, a Y corrected signal uy, a G corrected signal ug, . . . , an M corrected signal um using the hue direction intensity functions $F_R(H)$, $F_Y(H)$, $F_G(H)$, . . . $F_M(H)$ and the lightness and saturation direction intensity functions $G_R(L, S)$, $G_Y(L, S)$, $G_G(L, S)$, . . . , $G_M(L, S)$.

Specifically, the hue direction intensity calculating circuit 36 of the unit color corrected signal calculating circuit 32R determines a hue direction intensity signal vh from the hue signal H as follows:

$vh=F_R(H)$.

If the hue direction intensity function $F_R(H)$ is set as a discrete value with respect to the hue signal H, then the hue direction intensity signal vh can be determined according to one-dimensional linear interpolation (see Table 1 below).

TABLE 1

Hue direction intensity function $F_R(H)$

| | $H_2$ | | | | | | | | | |
|---|---|---|---|---|---|---|---|---|---|---|
| $H_1$ | 0.0 | 0.1 | 0.2 | 0.3 | 0.4 | 0.5 | 0.6 | 0.7 | 0.8 | 0.9 |
| 0 | 0.85 | 0.90 | 0.95 | 0.85 | 0.8 | 0.7 | 0.6 | 0.5 | 0.3 | 0.1 |
| 1 | 0 | 0 | 0 | 0 | 0 | 0 | 0 | 0 | 0 | 0 |
| 2 | 0 | 0 | 0 | 0 | 0 | 0 | 0 | 0 | 0 | 0 |

TABLE 1-continued

Hue direction intensity function $F_R(H)$

| | $H_2$ | | | | | | | | | |
|---|---|---|---|---|---|---|---|---|---|---|
| $H_1$ | 0.0 | 0.1 | 0.2 | 0.3 | 0.4 | 0.5 | 0.6 | 0.7 | 0.8 | 0.9 |
| 3 | 0 | 0 | 0 | 0 | 0 | 0 | 0 | 0 | 0 | 0 |
| 4 | 0 | 0 | 0 | 0 | 0 | 0 | 0 | 0 | 0 | 0 |
| 5 | 0 | 0.1 | 0.2 | 0.3 | 0.4 | 0.5 | 0.6 | 0.7 | 0.8 | 0.85 |

*$H = H_1 + H_2$

The lightness and saturation direction intensity calculating circuit 38 of the unit color corrected signal calculating circuit 32R determines a lightness and saturation direction intensity signal va from the lightness signal L and the saturation signal S as follows:

$va=G_R(L, S)$.

If the lightness and saturation direction intensity function $G_R(L, S)$ is set as a discrete value with respect to the lightness signal L and the saturation signal S, then the lightness and saturation direction intensity signal va can be determined according to one-dimensional linear interpolation (see Table 2 below).

TABLE 2

Lightness and saturation direction intensity function $G_R(L, S)$

| | S | | | | | | | | | |
|---|---|---|---|---|---|---|---|---|---|---|
| L | 0.1 | 0.2 | 0.3 | 0.4 | 0.5 | 0.6 | 0.7 | 0.8 | 0.9 | 1.0 |
| 0.0 | 0.1164 | 0.2267 | 0.3435 | 0.4635 | 0.5834 | 0.6999 | 0.8098 | 0.9097 | 0.9963 | 1.0000 |
| 0.1 | 0.1131 | 0.2222 | 0.3337 | 0.4467 | 0.5705 | 0.7041 | 0.8167 | 0.9074 | 1.0000 | 1.0000 |
| 0.2 | 0.1132 | 0.2215 | 0.3348 | 0.4813 | 0.6190 | 0.7359 | 0.8502 | 0.9598 | 1.0000 | 1.0000 |
| 0.3 | 0.1184 | 0.2250 | 0.3734 | 0.5686 | 0.6956 | 0.7694 | 0.8849 | 0.9871 | 1.0000 | 1.0000 |
| 0.4 | 0.1308 | 0.2834 | 0.4560 | 0.5901 | 0.7271 | 0.8084 | 0.9256 | 0.9701 | 1.0000 | 1.0000 |
| 0.5 | 0.1522 | 0.3274 | 0.4694 | 0.6072 | 0.7500 | 0.8368 | 0.9368 | 0.9991 | 1.0000 | 1.0000 |
| 0.6 | 0.1845 | 0.3175 | 0.4300 | 0.6114 | 0.7511 | 0.8386 | 0.9134 | 1.0000 | 1.0000 | 1.0000 |
| 0.7 | 0.2298 | 0.2944 | 0.4145 | 0.5940 | 0.7171 | 0.7777 | 0.8798 | 1.0000 | 1.0000 | 1.0000 |
| 0.8 | 0.2900 | 0.3287 | 0.4094 | 0.5467 | 0.6347 | 0.6780 | 0.7909 | 0.9677 | 1.0000 | 1.0000 |
| 0.9 | 0.3669 | 0.3710 | 0.3615 | 0.3907 | 0.4206 | 0.4734 | 0.6312 | 0.8862 | 1.0000 | 1.0000 |

Tables 1 and 2 show, by way of example, the hue direction intensity function $F_R(H)$ and the lightness and saturation direction intensity function $G_R(L, S)$ with respect to R. The hue direction intensity function $F_R(H)$ and the lightness and saturation direction intensity function $G_R(L, S)$ with respect to Y are shown respectively in Tables 3 and 4 given below.

TABLE 3

Hue direction intensity function $F_Y(H)$

| | $H_2$ | | | | | | | | | |
|---|---|---|---|---|---|---|---|---|---|---|
| $H_1$ | 0.0 | 0.1 | 0.2 | 0.3 | 0.4 | 0.5 | 0.6 | 0.7 | 0.8 | 0.9 |
| 0 | 0.0 | 0.1 | 0.2 | 0.325 | 0.3 | 0.4 | 0.5 | 0.7 | 0.8 | 0.9 |
| 1 | 1.0 | 0.85 | 0.7 | 0.6 | 0.5 | 0.4 | 0.3 | 0.2 | 0.1 | 0 |
| 2 | 0 | 0 | 0 | 0 | 0 | 0 | 0 | 0 | 0 | 0 |
| 3 | 0 | 0 | 0 | 0 | 0 | 0 | 0 | 0 | 0 | 0 |
| 4 | 0 | 0 | 0 | 0 | 0 | 0 | 0 | 0 | 0 | 0 |
| 5 | 0 | 0 | 0 | 0 | 0 | 0 | 0 | 0 | 0 | 0 |

*$H = H_1 + H_2$

TABLE 4

Lightness and saturation direction intensity function $G_Y(L, S)$

| L | S | | | | | | | | | |
|---|---|---|---|---|---|---|---|---|---|---|
| | 0.1 | 0.2 | 0.3 | 0.4 | 0.5 | 0.6 | 0.7 | 0.8 | 0.9 | 1.0 |
| 0.0 | 0.1176 | 0.2282 | 0.3456 | 0.4663 | 0.5868 | 0.7035 | 0.8129 | 0.9114 | 0.9956 | 1.0000 |
| 0.1 | 0.1102 | 0.2192 | 0.3301 | 0.4424 | 0.5556 | 0.6693 | 0.7827 | 0.8955 | 1.0000 | 1.0000 |
| 0.2 | 0.1132 | 0.2212 | 0.3312 | 0.4429 | 0.5559 | 0.6698 | 0.7843 | 0.8992 | 1.0000 | 1.0000 |
| 0.3 | 0.1195 | 0.2296 | 0.3429 | 0.4583 | 0.5748 | 0.6911 | 0.8061 | 0.9187 | 1.0000 | 1.0000 |
| 0.4 | 0.1219 | 0.2394 | 0.3588 | 0.4793 | 0.5997 | 0.7190 | 0.8363 | 0.9505 | 1.0000 | 1.0000 |
| 0.5 | 0.1134 | 0.2459 | 0.3729 | 0.4963 | 0.6179 | 0.7396 | 0.8634 | 0.9910 | 1.0000 | 1.0000 |
| 0.6 | 0.0869 | 0.2443 | 0.3788 | 0.4998 | 0.6167 | 0.7388 | 0.8757 | 1.0000 | 1.0000 | 1.0000 |
| 0.7 | 0.0354 | 0.2298 | 0.3704 | 0.4805 | 0.5834 | 0.7026 | 0.8615 | 1.0000 | 1.0000 | 1.0000 |
| 0.8 | 0.0000 | 0.1977 | 0.3415 | 0.4288 | 0.5053 | 0.6169 | 0.8092 | 1.0000 | 1.0000 | 1.0000 |
| 0.9 | 0.0000 | 0.1431 | 0.2859 | 0.3353 | 0.3697 | 0.4676 | 0.7073 | 1.0000 | 1.0000 | 1.0000 |

The hue direction intensity signal vh and the lightness and saturation direction intensity signal va thus determined are multiplied by the multiplier 40 to produce an R corrected intensity signal vr as follows:

$$vr = vh \cdot va.$$

If a Y corrected signal $\Delta Y$, for example, among the four color corrected signals $\Delta CMYK_3$ is to be determined, then the R corrected intensity signal vr is multiplied by a correction coefficient $RCOR_Y$ of the color R with respect to the color Y by the multiplier 42, thus determining a unit color corrected signal ur as follows:

$$ur = vr \cdot RCOR_Y.$$

Similarly, in the unit color corrected signal calculating circuits 32Y, 32G, ..., 32M, corrected intensity signal are multiplied by respective correction coefficients of the colors Y, G, ..., M with respect to the color Y by the respective multipliers 42, thus determining unit color corrected signals uy, ug, ..., um.

The determined unit color corrected signals ur, uy, ug, ..., um are added by the adder 34 to determine a color corrected signal $\Delta Y$ for Y as follows:

$$\Delta Y = ur + uy + ug + \ldots + um.$$

Likewise, color corrected signals $\Delta C$, $\Delta M$, $\Delta K$ for C, M, K are determined using respective correction coefficients (correction coefficients $RCOR_C$, $RCOR_M$, $RCOR_K$ for the hue R). Since the four color corrected signals $\Delta CMYK_3$ (= $\Delta C$, $\Delta M$, $\Delta Y$, $\Delta K$) thus calculated are determined taking into account the lightness and saturation of the three color signals C, M, $Y_1$ which are supplied to the color correction circuit 12, the four color corrected signals $\Delta CMYK_3$ are produced as signals corresponding to not only the purity of the colors but also the lightness and darkness of the colors. Because the hue direction intensity functions $F_R(H)$, $F_Y(H)$, $F_G(H)$, ..., $F_M(H)$ and the lightness and saturation direction intensity functions $G_R(L, S)$, $G_Y(L, S)$, $G_G(L, S)$, ..., $G_M(L, S)$ are established according to measured values using the color chart, it is possible to correct colors with high accuracy. The gradation converting circuit 14 converts the gradations of the three color signals $CMY_1$ using respective tone reproduction curves for thereby generating three color signals $CMY_2$, and supplies the three color signals $CMY_2$ to the adder 26.

The maximum/minimum value calculating circuit 18 compares the magnitudes of the three color signals $CMY_1$ thereby to determine the maximum and minimum values Qmax, Qmin of the three color signals $CMY_1$, and supplies the maximum and minimum values Qmax, Qmin to the UCR circuit 16 and the reference signal generating circuit 20.

Based on the maximum and minimum values Qmax, Qmin supplied from the maximum/minimum value calculating circuit 18 and a desired UCR intensity setting, the UCR circuit 16 determines UCR corrective values for the three color signals $CMY_1$, and supplies the determined UCR corrective values as three color corrected signals $\Delta CMY_2$ to the ader 26.

The adder 26 adds the three color corrected signals $\Delta CMY_2$ to the three color signals $CMY_2$ supplied from the gradation converting circuit 14, thereby generating three color signals $CMY_3$ that have been corrected with respect to UCR, and supplies the three color signals $CMY_3$ to the adder 28.

The maximum and minimum values Qmax, Qmin outputted from the maximum/minimum value calculating circuit 18 are supplied to the reference signal generating circuit 20, which generates a reference signal sk for producing a black plate signal $K_3$.

The reference signal sk is generated as follows: Using the maximum and minimum values Qmax, Qmin and a predetermined control coefficient Gidx ($0 \leq Gidx \leq 1$) for controlling the width of gray, the reference signal sk is determined as follows:

$$sk = T \cdot Qmin + (1-T) \cdot Qmax$$

there a parameter T is defined as follows:

T=1 when Qmax $\leq$ (Gidx+1)·Qmin or Qmin=0,

T=0 when Qmax=Qmin, and

T=(Qmax−Qmin)/(Gidx−Gmin) when Qmin<Qmax<(Gidx+1)·Qmin.

When T=1, the difference between the maximum and minimum values Qmax, Qmin is large and the color represented by the three color signals $CMY_1$ is in a pure color range. When T=0, the maximum and minimum values Qmax, Qmin are equal to each other, and the color represented by the three color signals $CMY_1$ is gray. When 0<T<1, the difference between the maximum and minimum values Qmax, Qmin is small, and the color represented by the three color signals $CMY_1$ is in an impure color range. Therefore, when the color represented by the three color signals $CMY_1$ is in the pure color range, since T=1, the reference signal sk is equal to the minimum value Qmin. When the color represented by the three color signals $CMY_1$ is gray, since T=0, the reference signal sk is exactly the three color signals $CMY_1$ (Qmax=Qmin). When the color represented by the three color signals $CMY_1$ is in the impure color range, the reference signal sk is of a value determined by the maximum and minimum values Qmax, Qmin.

The reference signal sk thus generated is supplied as a signal for adjusting the level of a black plate signal $K_3$ to the black (K) plate signal generating circuit 22. The black (K) plate signal generating circuit 22 generates a black plate signal $K_3$ according to the predetermined conversion table from the reference signal sk. When the color represented by the three color signals $CMY_1$ is in the impure color range, the black plate signal $K_3$ can be increased or reduced depending on the degree of impurity according to the maximum and minimum values Qmax, Qmin. The impure color range can be adjusted by the control coefficient Gidx.

Then, the adder 28 adds the four color corrected signals $\Delta CMYK_3$, which includes the color corrected signals $\Delta C$, $\Delta M$, $\Delta Y$, $\Delta K$ generated by the color correction circuit 12, to the three color signals $CMY_3$ and the black plate signal $K_3$, thus generating four color signals $CMYK_4$ which have been corrected in colors. The four color signals $CMYK_4$ are then converted by the halftone dot % setting circuit 24 into four color signals $CMYK_5$ which are halftone dot % signals representative of the halftone dot % values of highlights (HL) and shadows (SH) as adjusted depending on output characteristics. Four film plates of C, M, Y, K are subsequently generated according to the four color signals $CMYK_5$.

With the arrangement of the present invention, as described above, since corrected signals are determined taking into account the lightness and saturation of desired colors, the corrected signals depend on not only the purity, but also the lightness and darkness, of a color. Colors can be corrected with greater accuracy by establishing the color intensity functions according to measured values.

Although a certain preferred embodiment of the present invention has been shown and described in detail, it should be understood that various changes and modifications may be made therein without departing from the scope of the appended claims.

What is claimed is:

1. A method of correcting a color in an input signal and generating an output signal based on the corrected color, comprising the steps of:
    determining a hue signal, a lightness signal, and a saturation signal for said input signal;
    determining a corrected intensity signal got each of a plurality of hues based on said hue signal, said lightness signal, and said saturation signal, using color corrective intensity functions which are externally correctable;
    correcting the corrected intensity signals for the respective hues using color corrective coefficients established for the respective hues, thereby generating color corrected signals for the respective hues; and
    combining said color corrected signals for the respective hues together to generate a corrected signal for said output signal,
    wherein said hue signal is determined from maximum, middle, and minimum values of the input signal which comprises a plurality of color signals, said lightness signal is determined from the maximum value of the input signals, and said saturation signal is determined from the maximum and minimum values of the input signal.

2. A method according to claim 1, wherein said corrected intensity signals are determined as the product of said color corrective coefficients established for the respective hues and the corrected intensity signals for the respective hues.

3. A method according to claim 1, wherein said input signal comprises color signals of cyan, magenta, and yellow, and said output signal comprises color signals of cyan, magenta, yellow, and black.

4. A method of correcting a color in an input signal and generating an output signal based on the corrected color, comprising the steps of:
    determining a hue signal, a lightness signal, and a saturation signal for said input signal;
    determining a corrected intensity signal for each of a plurality of hues based on said hue signal, said lightness signal, and said saturation signal, using color correcting intensity functions which are externally correctable;
    correcting the corrected intensity signals for the respective hues using color corrective coefficients established for the respective hues, thereby generating color corrected signals for the respective hues; and
    combining said color corrected signals for the respective hues together to generate a corrected signal for said output signal,
    wherein said color corrective intensity functions include a hue direction intensity function for obtaining a hue direction intensity signal from said hue signal, and a lightness and saturation direction intensity function for obtaining a lightness and saturation direction intensity signal from said lightness signal and said saturation signal.

5. A method according to claim 4, wherein said hue direction intensity function is established by temporarily establishing a function whose maximum value is set to a hue in question, determining an intensity signal from an input signal obtained when a reference color chart covering an entire hue range is read, using the temporarily established function and the lightness and saturation direction intensity function, and establishing a function to compensate for a color shift in a hue different from the hue in question as said hue direction intensity function when said intensity signal is adjusted to the hue in question.

6. A method according to claim 4, wherein said lightness and saturation direction intensity function is established by determining differences with a reference value of an input signal obtained when a reference color chart covering an entire hue range is read, for a plurality of different hues, and establishing functions for to the respective hues from said differences as said lightness and saturation direction intensity function.

7. A method according to claim 4, wherein said corrected intensity signals are determined as the product of said hue direction intensity signal and said lightness and saturation direction intensity signal.

8. A method according to claim 4, wherein said color corrective coefficients are established by establishing a hue direction intensity function whose maximum value is set to a hue in question, determining an intensity signal from an input signal obtained when a reference color chart covering an entire hue range is read, using the hue direction intensity function and the lightness and saturation direction intensity function, and establishing a coefficient to adjust the intensity signal to the hue in question as said color corrective coefficients.

9. An apparatus for processing an image-related input signal and generating an output signal and generating an output signal based on said processing, comprising:
    a hue, lightness, and saturation signal generating circuit for generating a hue signal, a lightness signal, and a saturation signal from said input signal which comprises a plurality of color signals;

a color corrected intensity signal calculating circuit for generating a color corrected intensity signal for each of a plurality of hues based on said hue signal, said lightness signal, and said saturation signal, using color corrective intensity functions which are externally correctable and established for said plurality of hues;

a color corrected signal calculating circuit for correcting the color corrected intensity signals for the respective hues using color corrective coefficients established for the respective hues, thereby generating color corrected signals for the respective hues; and a corrected signal calculating circuit for combining said color corrected signals together to generate said output signal; and wherein said color corrected intensity signal calculating circuit comprises a hue direction intensity calculating circuit for determining a hue direction intensity function, and a lightness and saturation direction intensity calculating circuit for determining a lightness and saturation direction intensity signal for said lightness signal and said saturation signal according to a lightness signal and said saturation direction intensity function, and wherein the color corrected intensity signals obtained from said hue direction intensity signal and said lightness and saturation direction intensity signal are corrected by the color corrective coefficients.

10. An apparatus for image processing, comprising:

an output signal calculating circuit, in which respective tone reproduction curves are used, for processing an input signal having color components according to processes including a gradation conversion process using said respective tone reproduction curves, said output signal calculating circuit thereby generating an output signal based on said input signal;

a hue, lightness, and saturation signal generating circuit for generating a hue signal, a lightness signal, and a saturation signal from said input signal;

a color corrected intensity signal calculating circuit for generating a color corrected intensity signal for each of a plurality of hues from said hue signal, said lightness signal, and said saturation signal, using color corrective intensity functions which are externally correctable and established for said plurality of hues;

a color corrected signal calculating circuit for correcting the color corrected intensity signals for the respective hues using color corrective coefficients established for the respective hues, thereby generating color corrected signals for the respective hues; and a corrected signal calculating circuit for adding said color corrected signals for the respective hues into a corrected signal for an output signal.

11. An apparatus according to claim 10, wherein said output signal calculating circuit comprises a gradation converting circuit for processing three color signals of cyan, magenta, and yellow according to the gradation conversion process, a black color signal calculating circuit for generating a color signal of black from said input signal, and a removed signal calculating circuit for generating the three removed color signals of cyan, magenta, and yellow by removing the color signal of black from said input signal, and wherein said three removed color signals of cyan, magenta, and yellow and said color signal of black are used as said output signal.

\* \* \* \* \*